Figure 1:
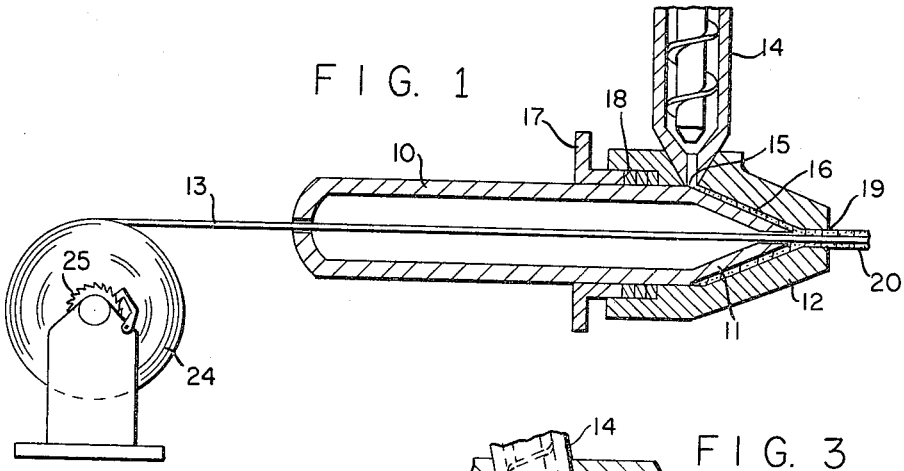
Figure 2:
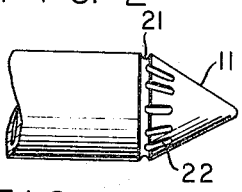
Figure 3:
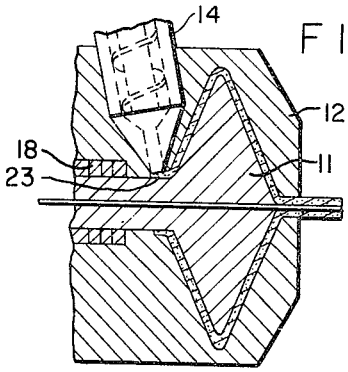
Figure 4:
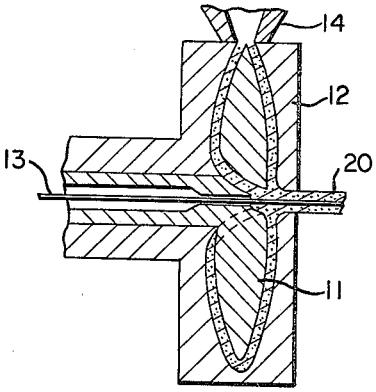
Figure 5:
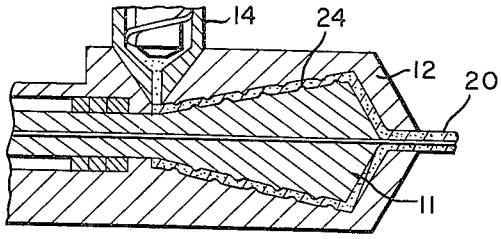
Figure 6:
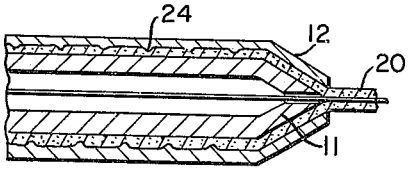

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 712

T869,007

APPARATUS AND PROCESS FOR EXTRUDING ELASTOMERIC MATERIAL

Martin Luther Brown, Elkton, Md., assignor to E. I. du Pont de Nemours and Company, Wilmington, Del., a corporation of Delaware

Original application Oct. 22, 1965, Ser. No. 501,552. Divided and this application Dec. 26, 1968, Ser. No. 810,420

Int. Cl. B29f *3/10, 3/012*

U.S. Cl. 264—174

1 Sheet Drawing. 11 Pages Specification

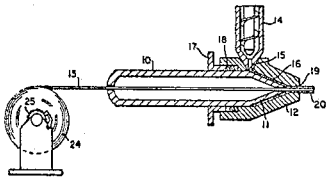

A process for sequentially heating to curing temperature and extruding a fast-curing elastomeric compound by introducing a raw stock directly into an extrusion head where the stock is heated to curing temperatures with heat generated by shearing the stock between a rotor housing and a rotor having a relief pattern on its surface and rotating at 200–2,000 r.p.m. then extruding the heated elastomer through a die.

The apparatus that can be used to carry out this process is an extruder made of a housing having a bore and an extrusion cavity with an extrusion orifice. The rotatable shaft is in the bore and is aligned with the extrusion orifice terminating in the extrusion cavity with a geometrically shaped rotor which defines a narrow annular passageway between the exterior surface of the rotor and the interior surface of the housing.

This process of friction heating an elastomeric material to its curing temperature also softens the material permitting a controllable discharge of the extrudate through the extrusion orifice. This process can be used to provide an outer coating of elastomeric material on a wire by axially drawing the wire through the center of the die orifice concurrently with the extrusion of an elastomeric material.

Dec. 16, 1969 M. L. BROWN T869,007

APPARATUS AND PROCESS FOR EXTRUDING ELASTOMERIC MATERIAL

Original Filed Oct. 22, 1965

INVENTOR

MARTIN LUTHER BROWN

BY William B. Cordiner, Jr.

ATTORNEY